United States Patent
Ideses et al.

(10) Patent No.: US 10,055,481 B2
(45) Date of Patent: Aug. 21, 2018

(54) METHOD AND SYSTEM FOR AUTOMATIC EVENT CLASSIFICATION

(71) Applicant: LogsHero Ltd., Tel-Aviv (IL)

(72) Inventors: Ianir Ideses, RaAnana (IL); Tomer Levy, Tel-Aviv (IL); Asaf Yigal, Tel-Aviv (IL); Ziv Segal, RaAnana (IL)

(73) Assignee: LogsHero Ltd., Tel-Aviv (IL)

( * ) Notice: Subject to any disclaimer, the term of this patent is extended or adjusted under 35 U.S.C. 154(b) by 0 days.

(21) Appl. No.: 15/465,727

(22) Filed: Mar. 22, 2017

(65) Prior Publication Data

US 2018/0025071 A1   Jan. 25, 2018

Related U.S. Application Data

(60) Provisional application No. 62/364,349, filed on Jul. 20, 2016.

(51) Int. Cl.
*G06F 17/30* (2006.01)
*G06N 99/00* (2010.01)

(52) U.S. Cl.
CPC .. *G06F 17/30598* (2013.01); *G06F 17/30353* (2013.01); *G06F 17/30368* (2013.01); *G06F 17/30424* (2013.01); *G06N 99/005* (2013.01)

(58) Field of Classification Search
CPC combination set(s) only.
See application file for complete search history.

(56) References Cited

U.S. PATENT DOCUMENTS

| | | | |
|---|---|---|---|
| 2007/0208730 A1* | 9/2007 | Agichtein | G06F 17/30702 |
| 2010/0015926 A1* | 1/2010 | Luff | H04L 41/0604 |
| | | | 455/67.13 |
| 2010/0094855 A1* | 4/2010 | Rouhani-Kalleh | |
| | | | G06F 17/30646 |
| | | | 707/706 |
| 2010/0229112 A1* | 9/2010 | Ergan | G06F 3/04895 |
| | | | 715/764 |
| 2015/0293954 A1* | 10/2015 | Hsiao | G06F 17/30312 |
| | | | 715/738 |
| 2015/0370787 A1* | 12/2015 | Akbacak | G06F 17/2836 |
| | | | 704/2 |
| 2016/0099963 A1* | 4/2016 | Mahaffey | H04L 63/1433 |
| | | | 726/25 |
| 2016/0360336 A1* | 12/2016 | Gross | H04W 4/001 |
| 2016/0360382 A1* | 12/2016 | Gross | G06F 3/0488 |

* cited by examiner

*Primary Examiner* — Farhan Syed

(57) ABSTRACT

A system and methods for classification of events, the system including a memory, a network interface, and a processor configured to monitor system events via the network interface and store the system events as an event log in the memory, collect information about events from various web resources, extract, from the event log and the collected event information, labeling data including data about urgency of events and generate, based on the extracted labeling data, labeling data structures ascribing labels to respective events, extract, from the event log and the collected event information, event features data and generate, based on the extracted event features data, event features data structures ascribing features to respective events, and formulate decision rule structures for identification of urgent events based on the labeling data structures and the event features data structures.

27 Claims, 3 Drawing Sheets

METHOD AND SYSTEM FOR AUTOMATIC EVENT CLASSIFICATION

RELATED APPLICATION

This application claims the benefit of priority under 35 USC § 119(e) of U.S. Provisional Patent Application No. 62/364,349 filed Jul. 20, 2016, the contents of which are incorporated herein by reference in their entirety.

FIELD AND BACKGROUND OF THE INVENTION

Many Information Technology (IT) infrastructures utilize services for processing and storage of data. Such services include, for example, a data center, a private cloud, a VMware or Open stack environment, Mobile environment, IoT devices, AMAZON WEB SERVICES, INC.©, MICROSOFT® AZURE™, public cloud security tools, log analytics platforms and other cloud services.

These services may have limited availability, stability, scalability or security due to multiple reasons, including, but not limited to, frequent variations in loads, software changes, configuration changes, hardware failure, human error, cyber attack and malicious users. For example, constant variations in the tasks and in the number of active users may cause great fluctuations in the processing performance. Therefore, IT administrators may face frequent failures and reliability issues.

Some known platforms enable IT administrators to monitor data, events and/or logs, in order to collect information about various issues, for example by processing data gathered from, for example, operating system logs, proxy server logs, server logs, application logs and load balancing logs.

SUMMARY OF THE INVENTION

A subject of some embodiments of the present invention is to provide ranked data from various sources about a certain system situation. Current platforms provide huge amounts of data and users may have difficulties in deducing conclusions from the data. By gathering and isolating issue-specific data, some embodiments of the present invention provide easy-to-understand visualization of information about the specific situation and possible solutions.

An aspect of some embodiments of the present invention provides a system for classification of events, the system including a memory, a network interface and a processor configured to execute a code for: monitoring system events via the network interface and storing the system events as an event log in the memory, collecting information about events from various web resources, extracting, from the event log and the collected event information, labeling data including data about urgency of events and generating, based on the extracted labeling data, labeling data structures ascribing labels to respective events, extracting, from the event log and the collected event information, event features data and generating, based on the extracted event features data, event features data structures ascribing features to respective events, and formulating decision rule structures for identification of urgent events based on the labeling data structures and the event features data structures.

According to some embodiments of the present invention, the data about urgency of events includes at least one of data about stability, data about criticality, data about failure imminent, data about a denial-of-service attack, data about threats detected, data about anomalies detected, data about business impact, and data about relevance.

According to some embodiments of the present invention, the collected event information includes labeling data and event features received directly from a user via a feedback interface.

According to some embodiments of the present invention, the processor is configured to execute code for using a signature-less self-learning system for formulating the decision rule structures.

According to some embodiments of the present invention, the processor is configured to execute code for classification of log events according to locations of log events in the data structures.

According to some embodiments of the present invention, the processor is configured to execute code for combining the collected event information with data received directly from a user to formulate the decision rule structures.

According to some embodiments of the present invention, the processor is configured to execute code for formulating a solution list about a given event, including information about the event, according to the decision rules. The system may further include a solution database configured to store the formulated solution lists in association with the respective events, wherein the processor is further configured to execute code for receiving user queries about system events and providing the associated solution lists in response to the user queries.

According to some embodiments of the present invention, the system includes a user interface configured to receive user feedback about events, wherein the processor is further configured to execute code for extracting labeling data and/or event features data from the user feedback. The processor may be configured to execute code for building a user profile based on queries and/or labels received via the user interface. The processor may be configured to execute code for utilizing the user profile to enhance the labeling data extraction. The processor is configured to execute code for utilizing the user profile to generate a personal event scoring per user.

According to some embodiments of the present invention, the processor is further configured to detect patterns in the labeling and/or event features data structures and to formulate the decision rules based on the detected patterns.

According to some embodiments of the present invention, the system further includes a query interface to receive user queries about events, wherein the processor is further configured to execute code for extracting labeling data and/or event features data from the user queries. The processor may be further configured to execute code for monitoring user behavior at the query interface and to extract labeling data and/or event features data from the user queries. The processor may be further configured to execute code for monitoring the user behavior with a user service engine, to analyze the user behavior and to further formulate the decision rule structures based on the user behavior.

According to some embodiments of the present invention, the processor is further configured to execute code for mapping a user query into the labeling data structures and event features data structures, identifying based on the mapping query-related log events, and relating to the user query at least one associated decision rule.

According to some embodiments of the present invention, the processor is further configured to execute a translator to translate the events information to computable machine data.

According to some embodiments of the present invention, the processor is further configured to execute code for generating the labeling data structures in the form of data vectors, in which labeling data is stored in association with respective events. The labeling data may be stored in association with respective events and classification tasks.

According to some embodiments of the present invention, the processor is further configured to execute code for generating the labeling data structures in the form of clusters of events, wherein each cluster has a corresponding label. In some embodiments, at least one of the events belongs to more than one cluster. In some embodiments, at least one of the clusters is associated with a classification task.

According to some embodiments of the present invention, the processor is further configured to execute code for storing the system events in the event log along with a respective time stamp.

According to some embodiments of the present invention, the processor is configured to execute code for classifying the collected information according to respective events and/or classification tasks.

According to some embodiments of the present invention, the processor is configured to execute code for extracting the labeling data based on multiple monitored events.

Another aspect of some embodiments of the present invention provides a method for classification of events, the method including monitoring, by a processor, system events via the network interface and storing the system events as an event log in the memory, collecting, by the processor, event-related information about events from various web resources, extracting, by the processor, labeling data, including data about urgency of events, and event features data, from the event log and from the event-related information, generating, based on the extracted labeling data, labeling data structures ascribing labels to respective events, and based on the extracted event features data, event features data structures ascribing features to respective events, and formulating decision rule structures for identification of urgent events based on the labeling data structures and the event features data structures.

Another aspect of some embodiments of the present invention provides a method for classification of events, the method including receiving a user query about a system event via a user interface, monitoring, by a processor, user behavior in relation to the user interface, formulating decision rule structures for formulation of solution lists about events based on the user behavior, and instructing formulation and transmission to the user of a solution list relevant to the user query, based on the decision rules.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
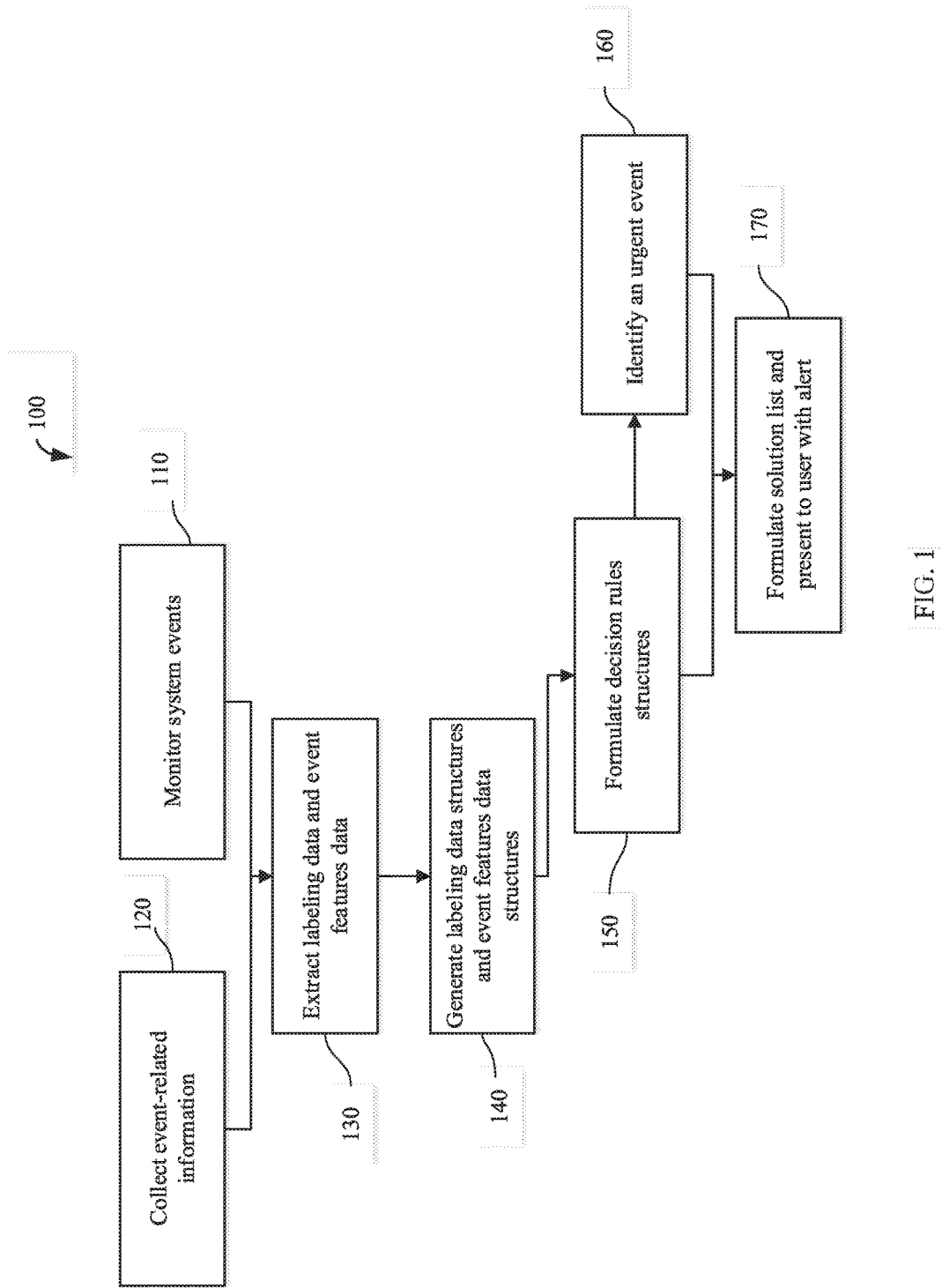
FIG. 1 is a schematic flowchart illustrating a method for classification of log events and alerting a user about an urgent event, for example an important and/or dangerous event, according to some embodiments of the present invention.

Some embodiments of the present invention provide a system for classification and presentation of system situations, such as states and/or events. In addition to system situation classification, possible remediation solutions gathered from various sources may be coupled to corresponding system situations, and may be presented to the user together with information about the issue or event. Additionally, alerts may be provided in cases of urgent situations.

Throughout the following description, the terms "situation" and "event" may be used interchangeably, meaning a system issue, event, state or status, for example, relating to system performance, availability, reliability, security, scalability, and/or other situation of the system. As used herein, a log event means any system and/or user action, situation, occurrence and/or error, such as, for example, log entries of user actions and/or system errors, system status messages, mobile device telemetry, control signals, absence of an expected event.

A classification system according to some embodiments of the present invention may monitor event logs of multiple target systems. An event log of a target system may document an updating list of timed situations of the target system. The classification system may collect situation-related information from various open web sources or available closed sources such as manuals, discussion boards or expert systems. The collected data is used for labeling the situations and/or for formulating solution lists such as, for example, data sheets of information and/or solutions related to respective situations. In case the situation is labeled as important, the classification system may alert a user about the important situation.

Further, the classification system may receive user queries about situations and provide solution lists related to the query-related situations. The classification system may monitor the user behavior, e.g. additional queries, interaction with the solution list, interaction with enterprise level data management systems, and/or any other relevant behavior following the query, and use the monitored behavior for labeling of events and/or formulating the solution lists.

Throughout the present description, "labeling" means giving labels to data items such as log events, event clusters, lack of events, and/or other system situations. Exemplary labels may include, for example, binary labels such as "interesting"/"not interesting", "critical"/"non critical", "malicious"/"benign", "urgent"/"not urgent", and/or other suitable binary labels, or non-binary labels about the importance of the situation, for example, the urgency, criticality, danger, and/or other properties of the situation. In some embodiments of the present invention, labels may also take the form of ordinal data, for example a numerical or enumerated value in some scale. Labeling data, according to some embodiments of the present invention, may be extracted based on monitoring an analyzing multiple situations and related behavior and/or input from various users and/or resources. Thus, alerts and decisions may be made by an open-ended engine that may detect issues by continuous self-learning, for example, without the need to provide pre-determined lists of signatures.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic flowchart illustrating a method 100 for classification of log events and alerting a user about an urgent event, for example an important and/or dangerous event, according to some embodiments of the present invention.

Method 100 may be executed by a classification system that monitors log events by a system monitor(s), gathers information by web monitor(s), and classifies the log events according to the gathered information. As used herein a monitor means a software application that collects information. A web monitor may include an agent such as, for example, a programmed web crawler bot that browses in the WWW and catches relevant information pages and or fragments. A web monitor may collect information about events and/or event types, from various web resources and/or other information resources, for example by crawling. The event-related information may include, for example, data from publicly available knowledge bases such as, for example, Wild sites, topic specific communities, Questions and Answers (Q&A) pages, source code sites and/or public expert systems. The collection of the event-related information may include, for example, reading and analyzing documentation of various systems and products, analyzing their text and/or extracting information about an event.

Figure 3:
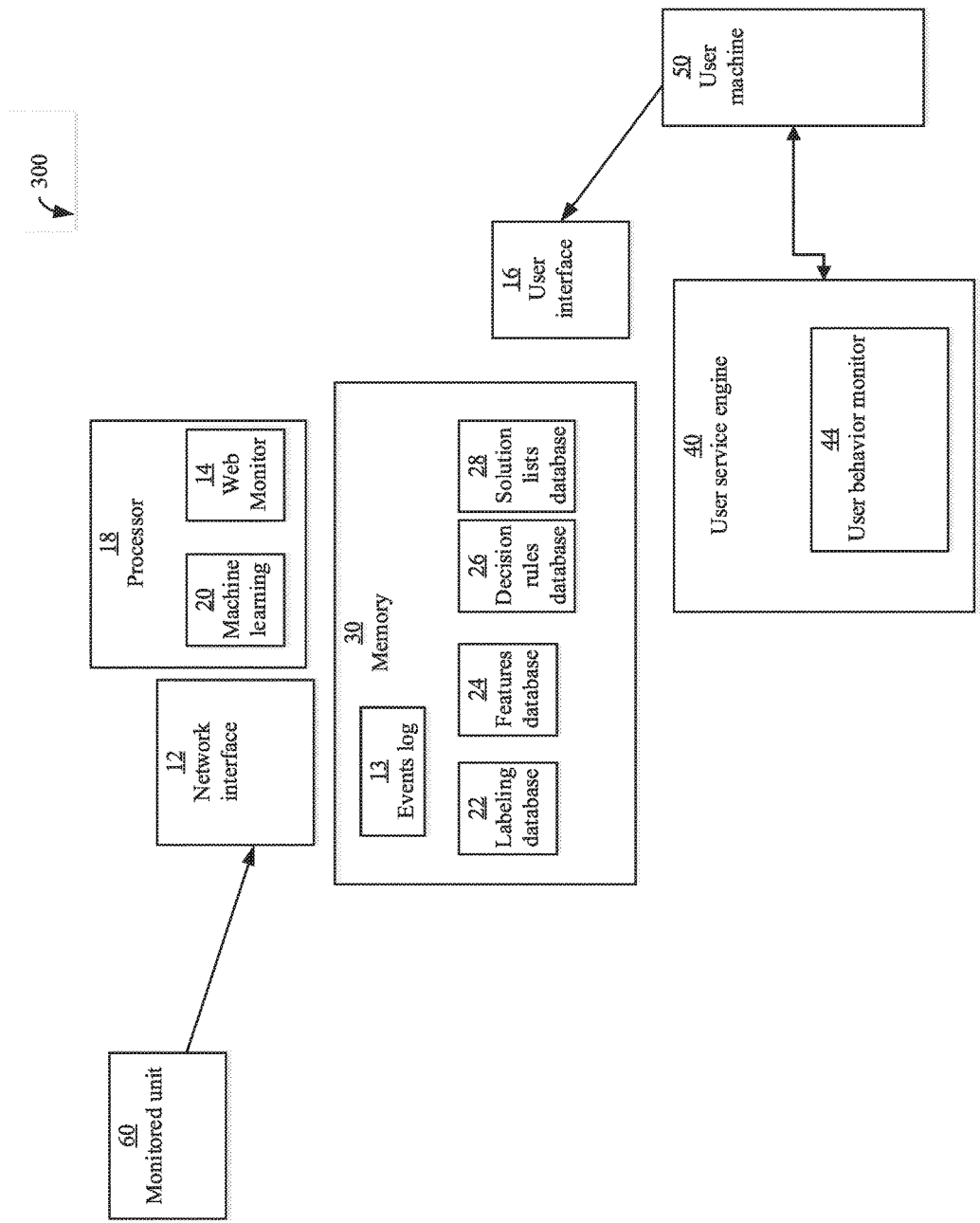
FIG. 3 is a schematic illustration of an exemplary system for classification of log events, according to some embodiments of the present invention.

Reference is also made to FIG. 3, which is a schematic illustration of an exemplary system 300 for classification of log events, according to some embodiments of the present invention. System 300 monitors a target unit, also referred to as a monitored unit, 60 such as, for example, a network of workstations or any other computerized system. Classification system 300 may include a memory 30, a network interface 12 and one or more processor(s) 18 that execute a web monitor 14, machine learning module 20, and a user service engine 40. Web monitor 14 may monitor information network(s) such as, for example, the World Wide Web (WWW). Additionally, system 300 may include various databases such as labeling database 22, features database 24, decision rules database 26 and solution lists database 28, which are described in detail herein.

As indicated in block 110, processor 18 may receive via network interface 12 streams of system events occurring in unit 60 and/or store the system events in an event log 13, for example along with respective time stamps. The system events may include, for example, log entries of user actions and/or system errors, system status messages, mobile device telemetry, control signals, and/or any other suitable system events. In some embodiments, the system events may include a notice about absence of an expected event and/or about relation between correlated events.

Further, as indicated in block 120, web monitor 14 may collect event-related information such as, for example, pattern matching for reserved words, recognizable product names, recognizable severity, combination of words/phrases that have been learned to be of significance, any algorithmic Natural Language Processing (NLP) output, and/or any other suitable event-related information. Web monitor 14 may include a translator to translate the gathered event-related information to computable machine data, which may be processed by processor 18. For example, features database 26 may include a multi-dimensional feature space. An event-related information entry may be analyzed to extract various features from the entry, and may be mapped into the feature space, for example as a multi-dimensional feature vector. Processor 18 may classify the collected information according to related events and/or classification tasks. Accordingly, in some embodiments, processor 18 may classify events by various classification engines that classify events in different classes for different purposes. That is, for example, an event-related feature may be associated with an event when related to a certain classification purpose and not associated with the same event when related to another classification purpose.

According to some embodiments of the present invention, event log 13 and the event-related information are provided to processor 18 in order to classify the log events and, for example, generate classified collection of solutions for respective system events.

As indicated in block 130, processor 18 may extract labeling data from event log 13 and/or from the event-related information, such as, for example, data about urgency of events, for example importance and/or severity of events. As used herein, data about urgency of events may include data about urgency, importance, severity, stability, criticality and/or measure of attention required by a user. For example, data about urgency may be deduced based on upcoming failure, attack, threat, anomaly, and/or any other occurrence type that requires attention of a user.

The extracted labeling data may include, for example, previously labeled events, for example analyzed by users. The extracted labeling data may include, for example, imported and/or processed data from publicly available knowledge bases such as, for example, Wild sites, topic specific communities, Questions and Answers (Q&A) pages, source code sites, product documentation, system guides, system manuals and/or public expert systems. The extracted labeling data may include, for example, systematically analyzed system events, previous user queries, user feedback and/or behavior implied, for example, by temporal profiles and/or interaction with the system.

Additionally, processor 18 may extract event features data from event log 13 and/or from the collected event-related information. The features data related to an event may include event identification and solution information such as, for example, a timestamp, length, richness of text, keywords, product packages, debug level, votes, code fragments, remarks and comments, expert system analysis, event processes, event correlation, lack of expected events, and/or any other suitable information, for example, translated to a quantifiable measure, if needed.

For example, event features data may be projected on a multi-dimensional feature space. Labeling data may be projected to a separate multi-dimensional feature space. The feature and/or labeling spaces may be generated by textual and/or behavioral analysis. For example, text fragments are matched to known textual items. For example, numerical features such as length, frequency and/or other measure values are extracted from the text. Behavioral features may include implicit and/or explicit user interest in a log event, user offering of a clear and simple labeling approach, and/or any other suitable behavioral features.

For example, for a log saying "2016-06-06 ERROR_LOG Apache_Tomcat Failed to serve client with data, Aborting", the extracted features may be, for example, the timestamp, which may be used for monitoring frequency of an event, ERROR as a severity measure, Tomcat as the product name, and any other suitable extracted features. These features are then placed in an ordered feature vector. This vector may be of very high dimensionality, due to the high number of products, severity levels and other features. Additionally, for example, the severity feature ERROR, the event frequency, the product type and/or the length may be used as labeling data.

In some embodiments of the present invention, system 300 may further include a user feedback interface 16, by which system 300 may receive user feedback about events, for example about severity/urgency and/or other features of the event. Processor 18 may extract from the received user feedback, for example, labeling data and/or event features data.

Additionally, by user interface 16, processor 18 may directly receive from a user information about events, solutions suggested by the user and/or labeling of events suggested by a user, which may be used by processor 18 as labeling and event features data.

The extracted labeling data and event features may be stored in labeling database 22 and features database 24, respectively, in association with the respective events.

As indicated in block 140, based on the extracted labeling data, processor 18 may generate labeling data structures that ascribe labels to respective events in the form of, for example, data tables, vectors/matrices, clusters, and or any other suitable data structure. For example, processor 18 may deduce data about urgency, importance and/or danger of events from the labeling data extracted from event log 13 and/or from the event-related information. The labeling data may include and/or be ordered in a labeling space of multiple dimensions, such as, for example, dimensions of various types of key words, dimensions of various behavior types, and/or any other suitable labeling data dimensions. For example, a log event may include data regarding importance, user specific or user group importance, urgency and/or relevancy of the log. For example, processor 18 may identify keywords such as, for example, debug, info, error, fatal, exception, and/or any other suitable key words that may be indicative of urgency, importance and/or danger of an event. Such keyword lists and/or interpretation may be generated automatically, for example, by the machine learning process described herein. For example, user behaviors, for example user events, that are inspected frequently, may be indicative that these events are candidates to receive a high urgency label. In some embodiments of the present invention, specific events and/or types of events are assigned to trigger an alerting system. Then, processor 18 may translate labeling data, for example data about urgency, importance and/or danger of events, to labels ascribed to respective events.

In some embodiments of the present invention, the labels may provide binary classification such as, for example, important/not important, urgent/not urgent, dangerous/not dangerous, and/or any other suitable form of binary classification. In other embodiments, the labels may provide more levels of classification, for example, various levels of importance, urgency, danger, and/or any other suitable labeling parameter.

For example, processor 18 may generate the labeling data structures in the form of data vectors, in which labeling data is stored in association with respective events and, optionally, in association with classification tasks. In some other embodiments, processor 18 may cluster the events according to suitable and/or predetermined parameter(s) and generate the feature data in the form of clusters of events, wherein each cluster has a corresponding label. Some of the events may belong to more than one cluster. Some of the clusters may be associated with respective classification tasks. In some embodiments, processor 18 may classify the events by k-nearest neighbor classification, according to locations of extracted data items in the data structures, thus finding common patterns and and/or similarity between log events.

Further, based on the event features data, processor 18 may generate event features data structures that ascribe features to respective events, in the form of, for example, data tables, vectors/matrices, clusters, and or any other suitable data structure.

Processor 18 may execute a machine learning mechanism 20, which may formulate, based on the labeling data structures and the event features data structures, decision rule structures for identifying urgent events and/or deciding how to formulate a solution list for a given event, as indicated in block 150. The decision rule structures may constitute, for example, classifier engines that may be used by processor 18 for identifying and deciding.

For example, a decision rule may include thresholds in one or more dimensions of labeling data and/or of event features data. For example, processor 18 may allocate scores to data items. For example, score may be allocated to event titles, for example, so that ERROR has higher score than NOTICE and lower score than WARNING. In some embodiments, a log event is identified as important, for example, when an event title has at least the score of ERROR title. In some embodiments, in case several words included in an event log has allocated scores, a cumulative score may be computed for the event, and an event with higher cumulative score may be regarded as a more important event. For example, a decision rule may include sending an alert when a cumulative score is above a pre-defined threshold.

For example, processor 18 may allocate scores to event features that are more popular and/or mentioned more frequently. Processor 18 may include in a generated solution list an event feature such as, for example, a solution and/or explanation of a certain system situation, when the feature has a score above a certain threshold.

In order to formulate the decision rules, processor 18 may, for example, detect patterns in the labeling data and/or event features, which may imply on the urgency and/or other features of events. Machine learning mechanism 20 may include, for example, Neural Networks, Support Vector Machines, Deep Learning, Decision Trees, Hard/Soft Thresholds, Naive Bayes Classifiers and/or any other suitable learning systems and/or tools. Machine learning mechanism 20 may generate decision rule structures, for example in the form of vectors/matrices of features, set(s) of rules, decision trees and/or any other suitable form. For example, each node or position in the decision rule structures may be attributed to a specific feature and/or feature vector. The decision rule structures may be sorted, for example, according to values of certain feature(s), and/or may be grouped according to mutual features values and/or patterns.

As indicated in block 160, processor 18 may identify an urgent event based on the decision rule structures. Once an urgent event is identified, as indicated in block 170, processor 18 may formulate, according to the decision rules, a solution list, e.g. classified collection of features and/or solutions for the identified urgent event, and may send an alert to be presented to the user about urgent event, along with the solution list.

The formulated decision rules may be stored in decision rules database 26 and may be updated by processor 18, for example whenever a decision rule is changed by machine learning mechanism 20. The solution lists may be generated or re-generated by processor 18, for example upon a change in a relevant decision rule identification of an urgent event and/or receiving of a user's query about an event, and may be stored in solution lists database 28.

Figure 2:
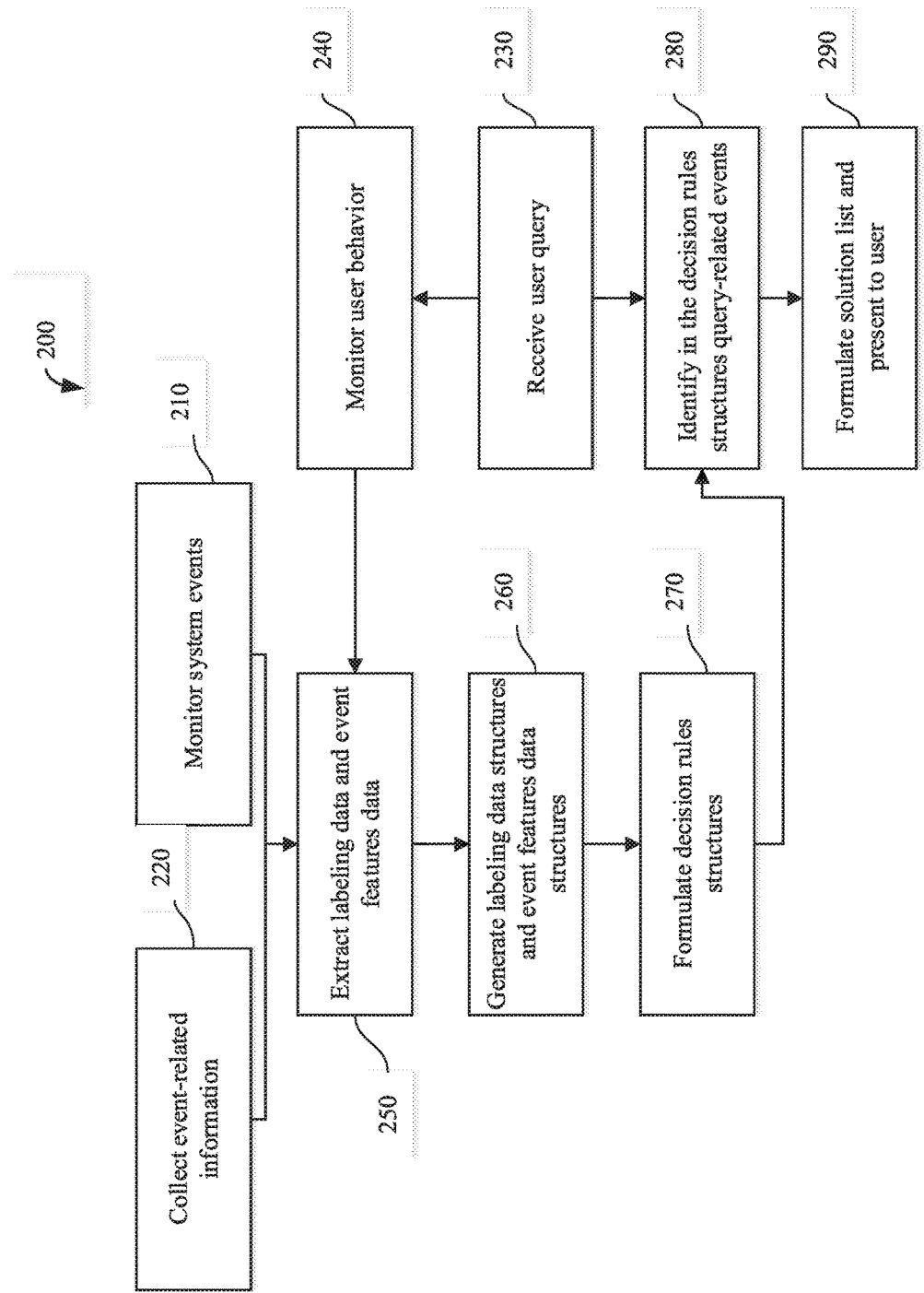
FIG. 2 is a schematic flowchart illustrating a method for classification of log events and based on user behavior and/or queries, according to some embodiments of the present invention.

Reference is now made to FIG. 2, which is a schematic flowchart illustrating a method 200 for classification of log events and based on user behavior and/or queries, according to some embodiments of the present invention. As indicated in blocks 210 and 220, processor 18 may receive streams of system events and collect event-related information, as described in detail with reference to FIG. 1.

As shown in FIG. 3, user service engine 40 may include a user behavior monitor 44, which may be, for example, a software component to monitor and analyze user behavior. As indicated in block 230, user service engine 40 may receive via interface 16 user queries about system events from a user machine 50. In some embodiments of the present invention, processor 18 extracts labeling data and event features data from the user queries. For example, as indicated in block 240, user service engine 40 may monitor by behavior monitor 44 user behavior, for example interaction with solution lists results and/or with service engine 40 such as, for example, opening of links, queries, reviewing queries results, consequent queries, last query performed, editing of alerts, import and export of data from enterprise data management systems, deleting of solution list results, and/or any other suitable form of interaction. Behavior monitor 44 may send user behavior monitoring data to processor 18. Processor 18 may analyze the user behavior and extract labeling data and/or event features data from the user behavior, for example along with the of system events and collected event-related information, as indicated in block 250.

As indicated in blocks 260 and 270, based on the extracted labeling data and/or event features data, processor 18 may generate labeling data structures that ascribe labels to respective events and event features data structures that ascribe features to respective events, as described in detail with reference to FIG. 1. Further, processor 18 may formulate decision rule structures, as described in detail with reference to FIG. 1. Accordingly, in some embodiments of the present invention, processor 18 may analyze the user behavior and base the formulation of the decision rule structures on the user behavior.

Upon receiving a user query, as indicated in block 280, user service engine 40 may find in decision rule structures database 26 decision rules related to the query. For example, queries are mapped into the labeling and/or event features data structures, for example into the multidimensional labeling and/or event features spaces, and accordingly a suitable decision rule may be applied. In some embodiments of the present invention, the user's behavior in relation to the query may be used to obtain the labeling data, as described in detail herein, in order to provide relevant decision rules. For example, processor 18 may identify in the rule structures events related to the query, for example based on the projection of the query on the labeling/feature spaces and identifying of related events. Then, processor 18 may relate to the query the decision rule structures associated with query-related events.

Then, as indicated in block 290, user service engine 40 may obtain a solution list from database 28 that relate to the query, for example solution lists associated with events identified by processor 18 as related to the query. User service engine 40 may provide the obtained solution list to the user in response to the user query. In some embodiments of the present invention, processor 18 may formulate relevant solution lists upon receiving a query from a user, for example based on related decision rules received from database 26.

In some embodiments of the present invention, processor 18 may use user feedback received via user feedback interface 16 to create personal user profiles. Processor 18 may correlate received feedback to respective users, for example, by generating a feedback-user correlation matrix and/or store the feedback-user correlation matrix in memory 30. Then, processor 18 may determine the personal labeling requirements of a user based on the user's feedback, which may vary according to the user's use of the system. For example, a certain user may require labeling about aspects of database relations, while another user may require labeling about aspects of security. For example, machine learning mechanism 20 may learn the personal labeling requirements by non-supervised learning methods including, for example, k-means clustering, Linear Discriminant Analysis (LDA) and/or any other suitable classification algorithm.

According to the personal labeling requirements, processor 18 may create personal user profiles, each including the personal labeling requirements of the respective user, and/or store the personal user profiles in memory 30. The number of profiles stored in memory 30 may vary dynamically. Processor 18 may use the personal user profiles to calculate labels based on behavioral data in view of the user's profile and thus, for example, to enhance and reinforce implicit user labeling and to augment data scoring. For example, based on the user profile, the extraction of labeling data may be enhanced by matching the labeling to the user's requirements. For example, based on the user profile, a personal event scoring per user may be generated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for classification of events, the system comprising:
    a memory;
    a network interface; and
    a processor configured to execute a code for:
        monitoring a plurality of system events, using a web monitor, via the network interface and storing the plurality of system events as an event log in the memory;
        accessing a plurality of online publicly available knowledge bases and collecting information about said plurality of system events, said plurality of publicly available knowledge bases include at least one member of a group consisting of Wiki sites, topic specific communities, Questions and Answers (Q&A) pages, source code sites, product documentation, system guides, system manuals and public expert systems;
        extracting, from the event log, labeling data comprising data, that according to an analysis of said information collected from said plurality of publicly available knowledge bases, is identified as indicative of urgency of each of said plurality of system events;
        generating, based on the extracted labeling data, labeling data structures ascribing labels to each of said plurality of system events;
        extracting, from the event log and according to said analysis of the collected event information, event features data;
        generating, based on the extracted event features data, event features data structures ascribing features to each of said plurality of system events;
        formulating decision rule structures for identification of an urgency level of an event based on the labeling data structures and the event features data structures;
        determining for each of said plurality of system events a respective urgency level;
        identifying for each of said plurality of system events when said respective urgency level is above a predefined threshold;
        for each identified one of said plurality of system events having said respective urgency level above said predefined threshold, formulating a respective solution list for remediating said each identified one of said plurality of system events;
        generating an alert indicative of said each identified one of said plurality of system events; and
        sending to a user said respective solution list and said alert.

2. The system of claim 1, wherein data about urgency of events comprises at least one of data about stability, data about criticality, data about failure imminent, data about a denial-of-service attack, data about threats detected, data about anomalies detected, data about business impact, and data about relevance.

3. The system of claim 1, wherein the collected event information comprises labeling data and event features received directly from a user via a feedback interface.

4. The system of claim 1, wherein the processor is configured to execute code for using a signature-less self learning system for formulating the decision rule structures.

5. The system of claim 1, wherein the processor is configured to execute code for classification of log events according to locations of log events in the data structures.

6. The system of claim 1, wherein the processor is configured to execute code for combining the collected event information with data received directly from a user to formulate the decision rule structures.

7. The system of claim 1, further comprising a user interface configured to receive user feedback about events, wherein said processor is further configured to extract labeling data and/or event features data from the user feedback.

8. The system of claim 7, wherein the processor is configured to execute code for building a user profile based on queries and/or labels received via the user interface.

9. The system of claim 8, wherein the processor is configured to execute code for utilizing the user profile to enhance the labeling data extraction.

10. The system of claim 8, wherein the processor is configured to execute code for utilizing the user profile to generate a personal event scoring per user.

11. The system of claim 1, wherein said processor is further configured to detect patterns in the labeling and/or event features data structures and to formulate the decision rules based on the detected patterns.

12. The system of claim 1, further comprising a query interface to receive user queries about events, wherein said processor is further configured to extract labeling data and/or event features data from the user queries.

13. The system of claim 12, wherein the processor is further configured to monitor user behavior at the query interface and to extract labeling data and/or event features data from the user queries.

14. The system of claim 1, further comprising a solution database configured to store the formulated solution lists in association with the respective events, wherein the processor is further configured to receive user queries about system events and to provide the associated solution lists in response to the user queries.

15. The system of claim 13, wherein the processor is further configured to monitor the user behavior with a user service engine, to analyze the user behavior and to further formulate the decision rule structures based on the user behavior.

16. The system of claim 1, wherein the processor is further configured to:
    map a user query into the labeling data structures and event features data structures;
    identify based on the mapping query-related log events; and
    relate to the user query at least one associated decision rule.

17. The system of claim 1, wherein the processor is further configured to execute a translator to translate the events information to computable machine data.

18. The system of claim 1, wherein the processor is configured to generate the labeling data structures in the form of data vectors, in which labeling data is stored in association with respective events.

19. The system of claim 18, wherein the labeling data is stored in association with respective events and classification tasks.

20. The system of claim 1, wherein the processor is configured to generate the labeling data structures in the form of clusters of events, wherein each cluster has a corresponding label.

21. The system of claim 20, wherein at least one of the events belongs to more than one cluster.

22. The system of claim 20, wherein at least one of the clusters is associated with a classification task.

23. The system of claim 1, wherein the processor is configured to store the system events in the event log along with a respective time stamp.

24. The system of claim 1, wherein the processor is further configured to classify the collected information according to respective events and/or classification tasks.

25. The system of claim 1, wherein the processor is configured to extract the labeling data based on multiple monitored events.

26. A method for classification of events, the method comprising:

monitoring, by a processor using a web monitor, a plurality of system events via the network interface and storing the plurality of system events as an event log in the memory;

accessing, by the processor, a plurality of online publicly available knowledge bases and collecting event-related information about said plurality of system events, said plurality of publicly available knowledge bases include at least one member of a group consisting of Wiki sites, topic specific communities, Questions and Answers (Q&A) pages, source code sites, product documentation, system guides, system manuals and public expert systems;

extracting, by the processor, labeling data, comprising data, that according to an analysis of said information collected from said plurality of publicly available knowledge bases, is identified as indicative of urgency of each of said plurality of system events, and event features data, from the event log and from the event-related information;

generating, based on the extracted labeling data, labeling data structures ascribing labels to each of said plurality of system events, and based on the extracted event features data, event features data structures ascribing features to each of said plurality of system events;

formulating decision rule structures for identification of an urgency level of an event based on the labeling data structures and the event features data structures;

determining for each of said plurality of system events a respective urgency level;

identifying for each of said plurality of system events when said respective urgency level is above a predefined threshold;

for each identified one of said plurality of system events having said respective urgency level above said predefined threshold, formulating a respective solution list for remediating said each identified one of said plurality of system events;

generating an alert indicative of said each identified one of said plurality of system events; and sending to a user said respective solution list and said alert.

27. The system of claim 1, wherein said analysis of said information collected from said plurality of publicly available knowledge bases is conducted using Natural Language Processing (NLP) algorithm.

* * * * *